H. AND L. HOFFMAN.
SEEPAGE INTERCEPTING COWL FOR MOTOR VEHICLES.
APPLICATION FILED APR. 19, 1919. RENEWED JAN. 29, 1920.
1,334,372.  Patented Mar. 23, 1920.
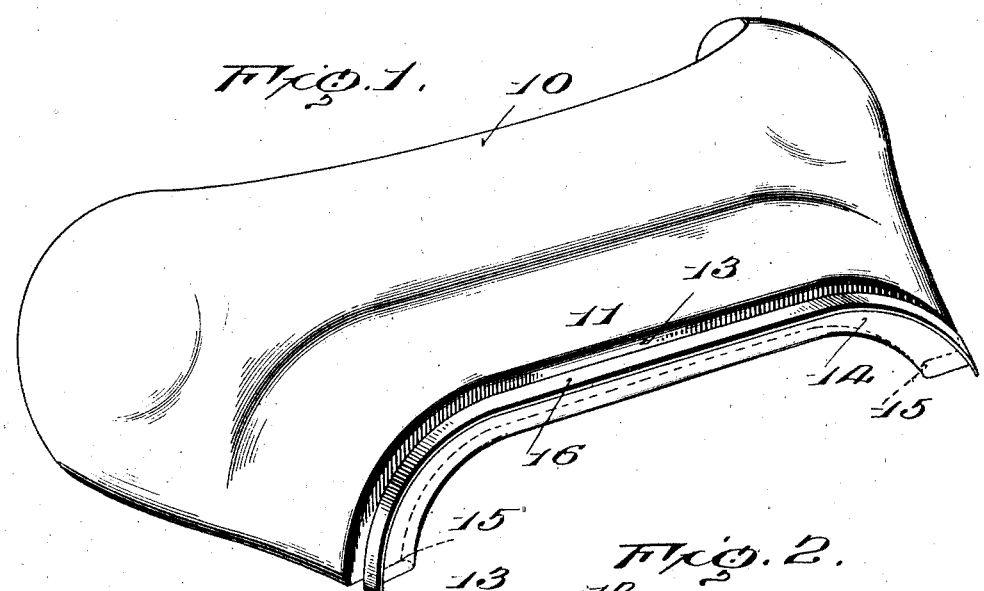
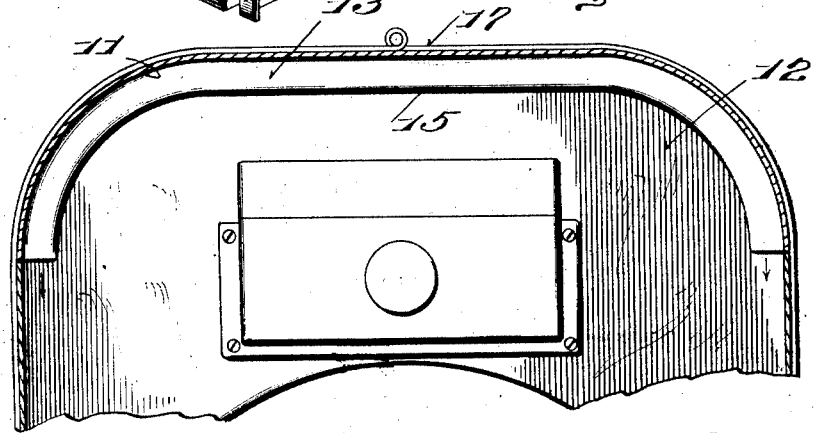
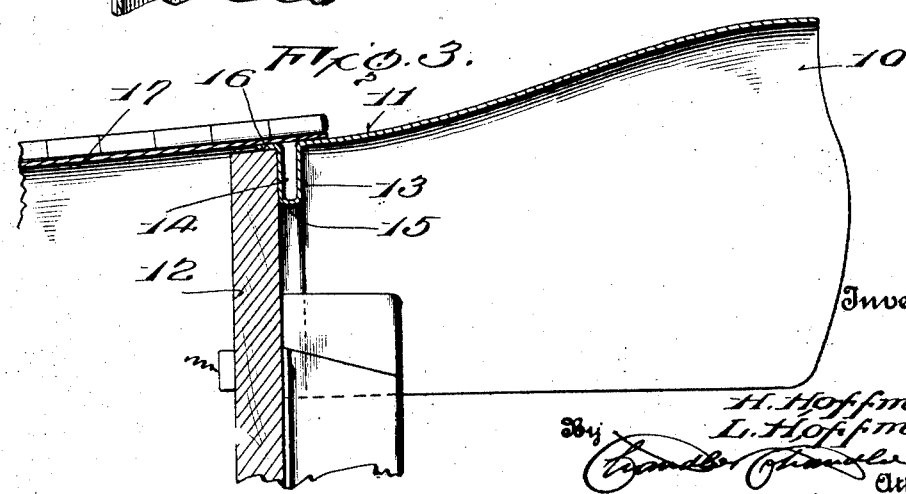

UNITED STATES PATENT OFFICE.

HARRY HOFFMAN AND LOUIS HOFFMAN, OF PHILADELPHIA, PENNSYLVANIA.

SEEPAGE-INTERCEPTING COWL FOR MOTOR-VEHICLES.

1,334,372.     Specification of Letters Patent.     Patented Mar. 23, 1920.

Application filed April 19, 1919, Serial No. 291,356. Renewed January 29, 1920. Serial No. 354,871.

*To all whom it may concern:*

Be it known that we, HARRY HOFFMAN and LOUIS HOFFMAN, citizens of the United States, residing at Philadelphia, in the county of Philadelphia, State of Pennsylvania, have invented certain new and useful Improvements in Seepage - Intercepting Cowls for Motor-Vehicles; and we do hereby declare the following to be a full, clear, and exact description of the invention, such as will enable others skilled in the art to which it appertains to make and use the same.

This invention relates to motor vehicles and more particularly to means for preventing short circuiting by rain and wash water seepage, of the electrical instruments carried by the dashboard.

In some motor vehicles and particularly in the Ford car, the front end of the cowl has a depending flange that is bolted against the rear face of the dashboard, the rear end of the hood overlapping the upper edge of the dashboard and contiguous portion of the cowl. Water falling upon the cowl, runs downwardly and forwardly of it, a part seeping between the cowl flange and the rear face of the dashboard and a part seeping between the cowl and the dashboard edge and the hood and passing down the front face of the dashboard.

It is the object of the present invention to provide a cowl which will arrest such seepage water and conduct it laterally and discharge it beyond the instruments so as not to affect them.

In the drawing:

Figure 1 is a detail perspective view of the cowl removed from the automobile.

Fig. 2 is a vertical transverse sectional view through the forward portion of the cowl, looking forwardly toward the dashboard, on which the cowl is secured.

Fig. 3 is an enlarged vertical sectional view through the gutter of the cowl and through the dashboard.

In automobiles now in use, and especially Ford cars, the cowl has its forward edge turned at an angle and is bolted to the rear face of the dashboard. Rain and wash water seep between this turned down portion and the dashboard with the result that the electrical instruments on the dashboard become wet and short circuited. It is the particular object of the present device to prevent this seepage of water to the electrical instruments, by constructing the cowl, at the point of attachment to the dashboard, in such manner that no water can get to the dashboard.

The cowl, as clearly seen in the drawing, is of the same general outline as the cowls now in use, having the major end 10 and the minor end 11, the latter of which is attached to the dashboard 12. The forward, or minor end, of the cowl is bent downwardly, as at 13 and then upwardly, at 14, to form the gutter 15, which extends entirely across the upper and side portions of the cowl. The forward wall 14, of the gutter, has its upper edge extended forwardly to form the flange 16, which is engaged on the upper edge of the dashboard, as clearly seen in the sectional view, Fig. 3. The rear edge of the hood 17 is disposed to overlie the said flange 16, as shown.

It will be noted that the gutter is arranged rearwardly of the dashboard, and against the rear face thereof, and that the rear edge portion of hood overlies the flange of the cowl, whereby any water which runs forwardly down the inclined face of the cowl, will be caught in the gutter and carried off to one side. Any rain or wash water which flows rearwardly over the rear edge of the hood will be caught in the gutter, also, and be carried off to one side. There is thus provided a device which will effectively prevent any water getting between the hood and dashboard, or between the cowl and the dashboard, with the result that the electrical instruments on the dashboard will be kept in a proper dry condition, and short circuiting obviated.

What is claimed is:

1. A cowl for motor vehicles having a transversely extending gutter at its forward end and a dashboard engaging flange extending forwardly from the gutter.

2. In a motor vehicle, the combination with the dashboard, of a cowl hung at its forward end to the dashboard and provided with an open-topped gutter extending along and back of the dashboard, and a hood the rear of which extends over the dashboard and the forward end of the cowl.

3. A cowl for motor vehicles having an upper portion and side portions, the forward end of the cowl being formed with a depressed gutter extending continuously across the upper portion and along the side portions, and a forwardly directed dashboard engaging flange on the forward side of the gutter.

In testimony whereof, we affix our signatures, in the presence of a witness.

HARRY HOFFMAN.
LOUIS HOFFMAN.

Witness:
GEO. H. CHANDLEE.